US006638550B2

(12) United States Patent
Banko et al.

(10) Patent No.: US 6,638,550 B2
(45) Date of Patent: *Oct. 28, 2003

(54) METHOD FOR COATING SOLID CONFECTIONERY CENTERS

(75) Inventors: Jeffrey A. Banko, Blairstown; Kenneth S. Beasley, Hackettstown; David H. Reese, Washington; James D. Erd, Blairstown, all of NJ (US); Robert O. Brandt, Jr., Wilmington, NC (US); Malcolm A. Austin, Warsaw (PL)

(73) Assignee: Mars, Inc., McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/531,718

(22) Filed: Mar. 21, 2000

(65) Prior Publication Data

US 2002/0061349 A1 May 23, 2002

(51) Int. Cl.$^7$ ............................. A23G 1/00; A23G 3/00
(52) U.S. Cl. ................... 426/231; 426/302; 426/520
(58) Field of Search ............... 426/89, 93, 103, 426/302, 303, 304, 305, 306, 309, 231, 520

(56) References Cited

U.S. PATENT DOCUMENTS

| | | | |
|---|---|---|---|
| 3,557,718 A | 1/1971 | Chivers | |
| 3,874,092 A | 4/1975 | Huttlin | 34/130 |
| 3,991,225 A | 11/1976 | Blouin | 427/3 |
| 4,127,395 A | 11/1978 | McKey et al. | 55/20 |
| 4,168,674 A | 9/1979 | Futter | 118/695 |
| 4,230,615 A | 10/1980 | Crocker et al. | 260/34.2 |
| 4,245,580 A | 1/1981 | Okawara | 118/19 |
| 4,334,493 A | 6/1982 | Okawara | 118/19 |
| 4,430,003 A | 2/1984 | Beattie et al. | 366/173 |
| 4,478,171 A | 10/1984 | Bridges et al. | 118/64 |
| 4,554,887 A | 11/1985 | Yoakam et al. | 118/666 |
| 4,559,235 A | * 12/1985 | Miller | 426/520 X |
| 4,639,383 A | 1/1987 | Casey | 427/213 |
| 4,688,514 A | 8/1987 | Yamabayashi et al. | 118/19 |
| 4,725,446 A | 2/1988 | Forster et al. | 427/3 |
| 4,799,449 A | 1/1989 | Miyata et al. | 118/19 |
| 5,010,838 A | 4/1991 | Simelunas et al. | 118/19 |
| 5,038,709 A | * 8/1991 | Yamada et al. | 118/666 |
| 5,050,528 A | * 9/1991 | Yamada et al. | 118/19 |
| 5,100,683 A | 3/1992 | Singer et al. | 426/302 |
| 5,218,898 A | 6/1993 | Norris | 99/334 |
| 5,334,244 A | 8/1994 | Bohle | 118/19 |
| 5,495,418 A | 2/1996 | Latini et al. | 364/468 |
| 5,507,868 A | 4/1996 | Takei et al. | 118/19 |
| 5,571,547 A | 11/1996 | Serpelloni et al. | 426/103 |
| 5,582,643 A | 12/1996 | Takei et al. | 118/19 |
| 5,881,473 A | 3/1999 | Giogoli et al. | 34/134 |
| 5,900,261 A | 5/1999 | Ribadeau-Dumas et al. | ... 426/5 |
| 5,939,119 A | 8/1999 | Cheng et al. | 426/302 |
| 5,954,876 A | 9/1999 | Koch et al. | 118/13 |
| 5,965,181 A | 10/1999 | Barkalow et al. | 426/103 |
| 5,968,572 A | 10/1999 | Behnke et al. | 426/302 |
| 6,007,859 A | 12/1999 | Taylor et al. | 426/302 |
| 6,017,567 A | 1/2000 | Rosenpleter | 426/5 |

FOREIGN PATENT DOCUMENTS

| | | |
|---|---|---|
| DE | 1 924 398 | 11/1970 |
| DE | 35 19 052 | 1/1986 |
| DE | 44 41 350 | 6/1996 |
| EP | 0105394 | 4/1984 |
| EP | 0 132 480 | 2/1985 |
| EP | 0 323 552 | 7/1989 |
| EP | 0 382 160 | 8/1990 |
| EP | 0 105 394 | * 4/1994 |
| EP | 0 774 264 | 5/1997 |
| GB | 1 264 451 | 2/1972 |
| GB | 2 089 700 | 6/1982 |
| GB | 2 111 399 | 7/1983 |
| JP | 54 109089 | 8/1979 |
| JP | 61 128999 | 6/1986 |
| JP | 07-155111 | 6/1995 |
| JP | 08 117546 | 9/1996 |
| WO | WO 91/09989 | 7/1991 |

OTHER PUBLICATIONS

S.T. Beckett, "Industrial Chocolate Manufacture and Use" Blackie Academic & Professional Bishopbriggs, Glasgow, Scotland (1994) Second Edition, pp. 239–241.
International Preliminary Examination Report, International Application No. PCT/US01/07793.

* cited by examiner

Primary Examiner—Arthur L. Corbin
(74) Attorney, Agent, or Firm—Fitzpatrick, Cella, Harper & Scinto

(57) ABSTRACT

An improved coating apparatus and an improved method of coating a mass of centers are disclosed. The improved coating apparatus comprises a temperature sensor for measuring the temperature of the surface of the coated centers and/or a moisture sensor for measuring the moisture content of the surface of the coated centers. The improved method comprises drying coated centers by measuring the temperature of the surface of the coated centers in the mass using the temperature sensor and adjusting the temperature of the drying gas to maintain the surface temperature of the coated centers at a predetermined temperature and drying the coated centers until the moisture content of the surface of the coated centers is about 0% to about 30% water, by weight. Advantageously, the surface temperature and/or surface moisture measurements are conducted during the coating processing of the centers, while the centers are in the coating apparatus or during drying of the centers.

15 Claims, 3 Drawing Sheets

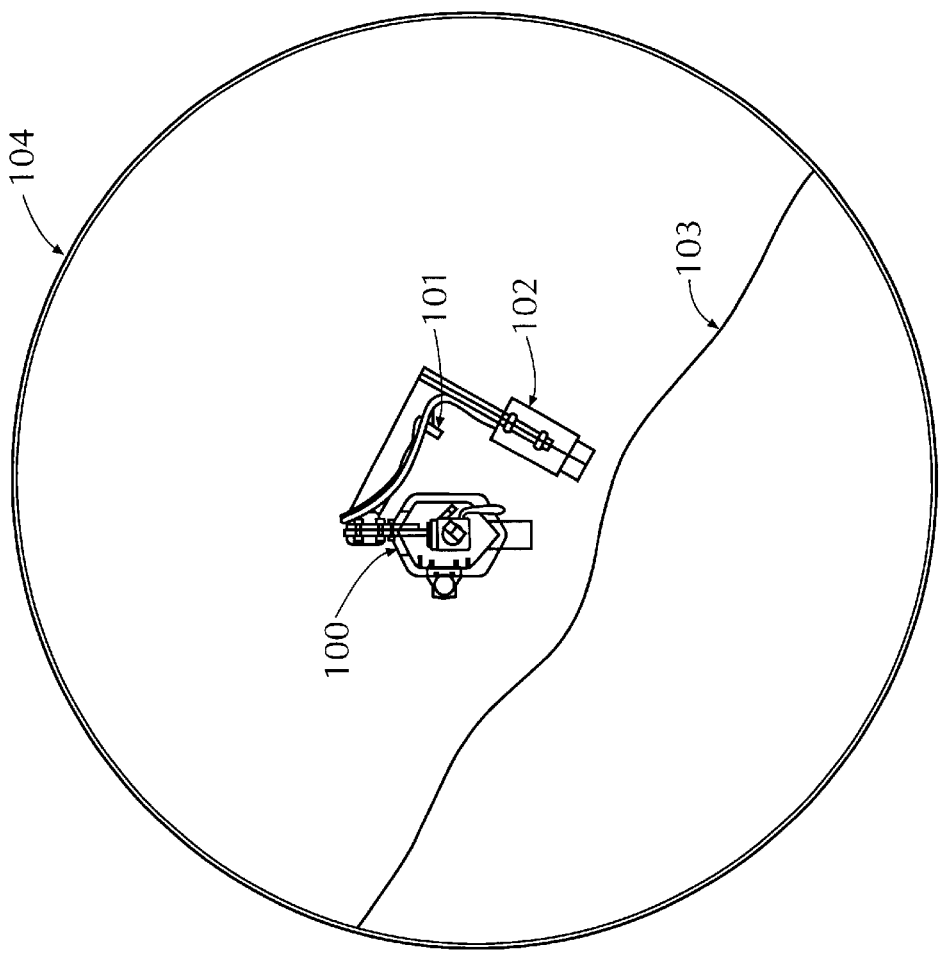

METHOD FOR COATING SOLID CONFECTIONERY CENTERS

BACKGROUND OF THE INVENTION

1. Field of the Invention

The invention relates to an improved method for producing coatings or shells on a mass of centers, and more particularly, a rapid and more efficient method of panning and film coating to produce coatings or shells on an intermixed mass of centers.

2. Related Background Art

Panning and film coating are related industrial processes used for the preparation of coated compositions. Panning is typically considered to relate to the preparation of sugar-based coatings, whereas film coating is considered to relate to the preparation of non-sugar based (e.g., polymeric) coatings. These coating processes, however, are conducted in the much the same manner. Both panning and film coating are repetitive processes consisting of drying fine layers of a coating solution on an intermixed mass of centers. On a microscopic level, panning is the drying and crystallization of the sucrose or other sugars that may be contained in the coating solution onto the surface of the center or onto the surface of the coated center. Film coating is the drying of cellulose polymers or other conventional film-forming materials contained in the coating solution onto the surface of the center or onto the surface of the coated center. In operation, the panning process comprises a repetition of three cycles: a coating solution application cycle, a distribution cycle, and a drying cycle; the film coating process comprises the simultaneous application and drying of the coating solution. In each process, thin layers of the coating material build upon each other to form the resulting shell or coating.

The centers referred to herein may be any of a variety of pelletized, tabletted, molded or granulated products. Coatings are applied to such centers to seal the center or to add an additional material to the center. Examples of such coated center compositions include pharmaceuticals, such as medicinally coated pills, tablets and non-pareils; chemical products such as detergents; and foodstuffs such as sugar or chocolate coated candies and mints. For pharmaceutical compositions, such coated compositions prevent waste of valuable drugs or medicines contained in the center, and ensures accurate measurement and delivery of dosage. In addition, such coatings serve to protect the centers from degradation or decomposition by exposure to air (oxygen) and/or humidity.

The most common technique used to coat centers is to provide a coating vessel in which a mass of centers are intermixed while dispensing a coating material onto the centers and drying the centers with a current or flow of a drying gas (dry air). Typically, the coating materials are powders such as sugar, sugar alcohols, waxes, and celluloses, or are liquids, most often an aqueous or solvent solution (a coating solution) of sugar, sugar alcohols, waxes, and celluloses. Coating solutions may be prepared by simply dissolving any suitable coating ingredient, or combination of ingredients (e.g., sucrose, dextrin, ethyl cellulose, and the like) in water. The coating solution may be dispensed or applied by spraying, pouring, or ladeling the solution onto a mass of centers. To ensure uniformity, and to prevent the coated centers from adhering to each other during the drying process, coating solutions are normally applied while the centers are being intermixed in a coating vessel. Typically, a current of drying gas is introduced into the vessel simultaneously with or subsequent to application of the coating material. The most commonly used gas is air, which is usually heated.

Efforts have been made to identify the preferred drying gas temperature, flow rate, moisture content, vigorousness of center intermixing and dispersion of the coating liquid to improve the efficiency of coating processes and the consistency and quality of the coated products produced thereby. Conventional processing parameters for each of these process variables have been identified. For example, to obtain an appropriate rate of drying required for formation of a high quality coating, the drying gas (air) has a dew point of about 5° C. (5.4 g water/kg dry air). The flow rate of the drying gas through the coating vessel is considered to be dependent upon the weight of the mass of the centers to be coated/dried and the type of coating vessel used. For example, for coating a mass of centers weighing about 400 kilograms (kg) using a rotatable drum, flow rates of about 1,800 ft$^3$/min to about 4,000 ft$^3$/min may be used, however, for a mass of centers weighing about 2,500 kg flow rates of about 8,000 ft$^3$/min to about 10,000 ft$^3$/min may be used. In contrast, coating a mass of centers weighing about 30 kilograms (kg) using a fluidized bed, flow rates of about 350 ft$^3$/min to about 1,000 ft$^3$/min may be used. The temperature or temperature range to which the drying gas may be adjusted is a predetermined temperature/temperature range that is dependent upon the thermal stability of the center to be coated. For example, for centers that are insensitive to high temperatures, that is, for centers that will not readily melt or degrade at high temperatures (e.g., greater than about 50° C.), the drying gas temperature is typically maintained at a temperature of about 50° C. to about 85° C. In contrast, if the centers are thermally sensitive, that is, melt at a relatively low temperature (e.g., less than about 50° C.) or are otherwise unstable at elevated temperatures or mildly elevated temperatures, the drying gas temperature is typically maintained at a temperature or within a range of temperatures that is below the melting or degradation temperature of the center.

There have been continuing attempts to refine coating processing operations. For example, Futter, U.S. Pat. No. 4,168,674 discloses a process whereby the bed temperature of the batch of tablets being coated in a rotating coating pan is sensed by a sensor. The coating process is monitored such that if during any one cycle there is a preselected difference between the sensed temperature and a reference temperature stored in memory devices, a signal will be produced. This process suffers from the disadvantage that the coated tablets may be damaged by repeated collisions with the sensor. Likewise, the sensor may be damaged by repeated collisions with the intermixing tablets in the rotating pan.

Yoakam, U.S. Pat. No. 4,554,887, discloses a coating apparatus with computer control in which a several operating parameters can be controlled via a computer. For example, the spray rate, air inlet temperature, air temperature in the coating pan, exhaust air temperature, coating pan speed, air flow, dew point, and composition of the spray material may be automatically controlled for producing coated tablets. Latini, U.S. Pat. No. 5,495,418, discloses a coating system which controls fewer processing variables to control the drying/spray cycles, such as the beginning and ending dry times and the length of spraying/amount of coating solution dispensed onto the centers.

None of the above methods or apparatus provide operators with the ability to monitor the actual progress of the coating process inside the coating apparatus and to rapidly adjust or modify the coating process based on such monitoring information. Accordingly, it would be advantageous to provide a simple and efficient coating method, apparatus and system for monitoring of the progress of the coating process by monitoring characteristics of the coated tablets or centers inside of the coating apparatus and a method by which the coating process could be readily controlled. It would be particularly advantageous to provide such a coating method, apparatus and system with which such a coating process could be conducted in a rapid and cost effective manner.

SUMMARY OF THE INVENTION

This invention relates to an improved method, apparatus and system for producing a shell coating on a mass of centers, comprising a coating vessel, through which is provided a current drying gas, in which an intermixed mass of centers is coated with a coating solution. An apparatus of this invention comprises a temperature sensor for measuring the temperature of the surface of the coated centers of the mass. Another apparatus of this invention comprises a moisture sensor for measuring the moisture content of the surface of the coated centers of the mass. A method of this invention comprises drying coated centers by measuring the temperature of the coated centers of the mass using the temperature sensor and adjusting the temperature of the drying gas to maintain the surface temperature of the coated centers of the mass at a predetermined temperature. Another method of this invention comprises measuring the moisture content of the surface of the coated centers using the moisture sensor and drying the coated centers until the moisture content of the surface of the coated centers is about 0% to about 30% water, by weight.

BRIEF DESCRIPTION OF THE DRAWINGS

FIG. 3 is a cross-sectional view of the coating apparatus of FIG. 2 taken along View A.

DETAILED DESCRIPTION OF THE INVENTION

Figure 1:
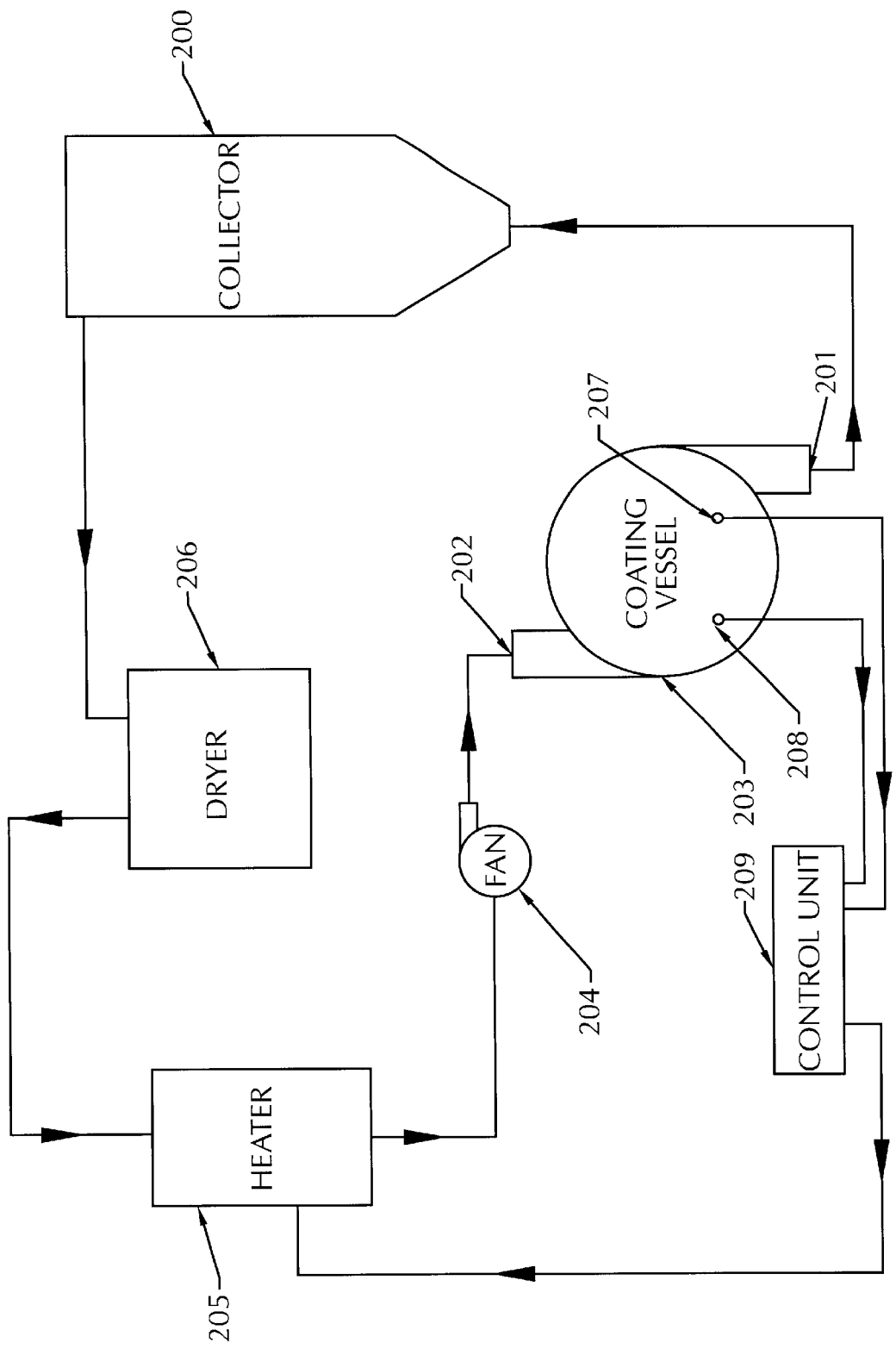
FIG. 1 is a block function diagram of the coating apparatus system of the invention.

The method of this invention may be practiced using any conventional or commercially available coating apparatus (e.g., panning or film coating apparatus) that has been modified to contain the temperature and moisture sensors described herein. Preferably, the shells produced using the method and apparatus of this invention are hard shells. One embodiment of this invention relates to an improved method for producing a shell coating on a mass of centers comprising dispensing a coating solution onto the mass of centers and drying the coated centers with a current of drying gas; the improvement comprising measuring the temperature of the surface of the coated centers of the mass and drying the coated centers by adjusting the temperature of the drying gas to maintain the temperature of the surface of the coated centers at a predetermined temperature, wherein the temperature of the drying gas is adjusted in response to the temperature measurement of the surface of the coated centers. Another embodiment of this invention relates to an improved method for producing a shell coating on a mass of centers comprising dispensing a coating solution onto the mass of centers and drying the coated centers with a current of drying gas; the improvement comprising measuring the moisture content of the surface of the coated centers of the mass and drying the coated centers until the moisture content of the surface of the coated centers is about 0% to about 30% water, by weight. Advantageously, the above-described surface temperature and surface moisture measurements are conducted during the coating processing of the centers, while the centers are in the coating vessel. Preferably, the method of this invention for producing a shell coating on a mass of centers comprises:

(a) measuring the temperature of the surface of the coated centers of the mass;

(b) measuring the moisture of the surface of the coated centers of the mass; and (c) drying the coated centers by adjusting the temperature of the drying gas in response to the temperature measurement of the surface of the coated centers to maintain the temperature of the surface of the coated centers at a predetermined temperature and drying the coated centers until the moisture content of the surface of the coated centers is about 0% to about 30% water, by weight.

Generally, the panning method of this invention: for producing a shell coating on a mass of centers comprises the steps of:

(a) placing a mass of centers in a coating vessel;

(b) intermixing the mass of centers;

(c) dispensing a coating solution onto the mass of centers;

(d) measuring the temperature of the surface of the coated centers of the mass using a temperature sensor;

(e) drying the coated centers by passing a current of drying gas through the coating vessel and adjusting the temperature of the drying gas in response to the temperature measurement of step (d) to maintain the temperature of the surface of the coated centers at a predetermined temperature; and (f) repeating steps (c) through (e) a predetermined number of times to produce a finished product.

Generally, the film coating method of this invention for producing a shell coating on a mass of centers comprises the steps of:

(a) placing a mass of centers in a coating vessel;

(b) intermixing the mass of centers;

(c) measuring the temperature of the surface of the coated centers of the mass using a temperature sensor;

(d) dispensing a coating solution onto the mass of centers while passing a current of drying gas through the coating vessel until the centers have attained a predetermined weight, wherein the temperature of the drying gas is adjusted in response to the temperature measurement of step (c) to maintain the temperature of the surface of the coated centers at a predetermined temperature; and (e) drying the coated centers to produce a finished product.

Each of the above methods may further comprise measuring the moisture content of the surface of the coated centers of the mass using a moisture sensor and drying the coated centers until the surface moisture of the coated centers is about 0% to about 30% water, by weight. Alternatively, these processes may comprise controlling the coating processing by the measurement of the moisture content of the coated centers. In this embodiment of the invention, the panning method for producing a shell coating on a mass of centers comprises the steps of:

(a) placing a mass of centers in a coating vessel;

(b) intermixing the mass of centers;

(c) dispensing a coating solution onto the mass of centers;
(d) drying the coated centers by passing a current of drying gas through the coating vessel;
(e) measuring the moisture content of the surface of the coated centers of the mass using a moisture sensor and drying the coated centers until the surface moisture of the coated centers is about 0% to about 30% water, by weight; and
(f) repeating steps (c) through (e) a predetermined number of times to produce a finished product.

In another embodiment of this invention, the film coating method for producing a shell coating on a mass of centers comprises the steps of:
(a) placing a mass of centers in a coating vessel;
(b) intermixing the mass of centers;
(c) measuring the moisture content of the surface of the coated centers of the mass using a moisture sensor;
(e) dispensing a coating solution onto the mass of centers while passing a current of drying gas through the coating vessel until the centers have attained a predetermined weight; and
(f) drying the coated centers until the surface moisture of the coated centers is about 0% to about 30% water, by weight to produce a finished product.

Coating processing using any of the above methods may be conducted for as long or as short as necessary to provide a finished product having a desired weight or weight gain or having a coating of a desired thickness. In the film-coating embodiment of the invention, the predetermined weight is typically expressed as a desired weight gain and reflects the final desired weight of the coated centers. For example, the weight of the coating (weight gain) may be as low as 2–5% of the total weight of the coated center (e.g., for enteric coated compositions) or as high as 80–90% (e.g., for jawbreakers).

The drying process used in this invention is based on maintaining a predetermined or desired temperature at the surface of the coated centers of the mass in the coating vessel and continuing the drying process until a predetermined or desired moisture content on the surface of the coated centers of the mass in the coating vessel is obtained. In this invention, the temperature and moisture of the surface of the coated centers of the mass may be measured or determined by any direct measurement method. As used herein, the terms "direct measurement" or "direct determination" refer to a technique or apparatus useful for measuring or determining the value of a parameter (e.g., temperature or moisture/water content) of the surface of the centers or coated centers in the coating vessel by scanning, examination or analysis of the center surfaces. Direct measurement or determination is different from and does not include indirect measurements or determinations, such as the determination of the moisture/water content of a mass of coated centers by measurement and analysis of the moisture/water content of the drying gas flowing into or out of the coating vessel. Accordingly, the drying process of this invention is based on maintaining the temperature on the surface of the coated centers of the mass at a predetermined temperature or within a predetermined temperature range, wherein the temperature is monitored by direct measurement of the surface of the centers in the coating vessel and continuing the drying process until a predetermined moisture content on the surface of the coated centers is obtained, wherein the moisture content is monitored by direct measurement of the surface of the centers in the coating vessel.

In this invention, the temperature of the surface of the centers is maintained by controlling the temperature of the drying gas. Moreover, the temperature of the drying gas is controlled or adjusted only to the extent required to maintain that predetermined temperature or predetermined temperature range. According to the method of this invention, the temperature of the drying gas no longer needs to be controlled to be less than the melting point or degradation temperature of a thermally sensitive center throughout the drying process. The temperature is permitted to vary across any temperature range as long as the temperature at the surface of the coated centers of the mass remains at a predetermined temperature or within a predetermined temperature range.

Drying of the coating solution on the surface of the centers in the mass involves evaporation of the water in the coating solution. As the water evaporates from the surface of the coated centers, the temperature of that surface cools. This process is called "adiabatic cooling." When large amounts of water are being evaporated (e.g., just after the coating solution has been dispensed onto the mass of centers), the cooling effect can become significant. Accordingly, the temperature of the drying gas may be increased significantly to offset the cooling effects of evaporation to maintain a predetermined surface temperature on the coated centers.

The method of this invention provides advantages for producing coatings on both thermally insensitive and thermally sensitive centers. This method, however is especially useful for coating of thermally sensitive centers. Conventional processing of such thermally sensitive centers required the temperature of the drying gas to be controlled to be less than the melting point or degradation temperature of a thermally sensitive center throughout the drying process. Thus, coating of low-melting centers, e.g., those having a melting point of less than 50° C., required very long processing times. In this invention, it is the temperature of the surface of such low-melting centers that is maintained below the melting point of the centers. Taking advantage of the effect of adiabatic cooling permits the use of a drying gas that has been heated to well above the melting point of the low-melting center; the temperature of the center remains below its melting point even while the temperature of the drying gas is significantly higher. For example, panning of chocolate- or cocoa-containing centers may be conducted using a drying gas at a temperature of greater than about 50° C. while maintaining the surface temperature of the coated chocolate- or coca-containing centers below the melting point thereof. Preferably, the surface temperature is in the range of about 20° C. to about 26° C., more preferably, the surface temperature is in the range of about 21° C. to about 25° C. and most preferably, the surface temperature is about 22° C. to about 24° C. Accordingly, the method of this invention is particularly useful for producing a coating on thermally sensitive centers having melting points or degradation temperatures of less than 50° C. This method is especially useful for producing a coating on thermally sensitive centers having melting points or degradation temperatures of less than 30° C., such as centers composed of chocolate, chocolate-containing compositions, cocoa-containing compositions and nut-flavored or nut-containing compositions, and the like, examples of which include milk chocolate, dark chocolate, white chocolate, peanut butter-containing compositions, chocolate-containing compositions and chocolate with an inclusion, such as chocolate-coated nuts (peanuts, almonds, cashews, etc.) chocolate-coated rice, chocolate-coated peanut butter-containing compositions, and the like.

In this invention, the moisture content of the surface of the centers is monitored to determine when a drying cycle is completed. The drying cycle is completed when the moisture content of the surface of the coated center reaches a predetermined moisture content. The predetermined moisture content will vary depending upon the material(s) in the coating solution to be coated on the centers. Generally, however, the predetermined moisture content of the surface of the coated centers will be about 0% to about 30% water, by weight. Preferably, the predetermined moisture content of the surface of the coated centers will be about 0% to about 20% water, by weight, more preferably, about 0% to about 10% water, by weight, and most preferably about 0% to about 5% water, by weight. When the drying cycle is determined to have reached completion, the mass of coated centers may be sprayed with an additional amount of coating solution to start another drying cycle or the coated centers may be removed from the coating vessel.

The method of this invention offers several important advantages over conventional coating processes. Because the method may be conducted using a drying gas at elevated temperatures, the drying rate can be increased significantly. In addition, because the surface moisture content coating can be readily determined, prolonged drying of the centers can be avoided, thereby reducing the time required to complete each drying cycle. As the overall coating process consists of repeated coating solution application and drying cycles, reducing the drying times can substantially reduce the overall processing time, thereby increasing the amount of coated product that can be produced within a given time. The method of this invention can also provide coated centers of higher quality than can be obtained using conventional processing. Because this method can reduce drying time and thus the amount of time that the coated centers are intermixed in the coating vessel, damage to the coating caused by collisions between coated centers or coated centers and the coating vessel are also reduced. Accordingly, significant processing cost reductions and product quality improvement may be realized by using the method of this invention.

An improved coating apparatus according to this invention comprises a coating vessel, a coating solution dispenser, a gas inlet port and a gas outlet port; wherein the improved coating apparatus comprises a temperature sensor for measuring the temperature of the surface of the coated centers of the mass. In another embodiment, an improved coating apparatus according to this invention comprises a coating vessel, a coating solution dispenser, a gas inlet port and a gas outlet port; wherein the improved coating apparatus comprises a moisture sensor for measuring the moisture content of the surface of the coated centers of the mass. Preferably, the improved coating apparatus contains both a temperature sensor and a moisture sensor for: measuring the surface of the coated centers of the mass.

Figure 2:
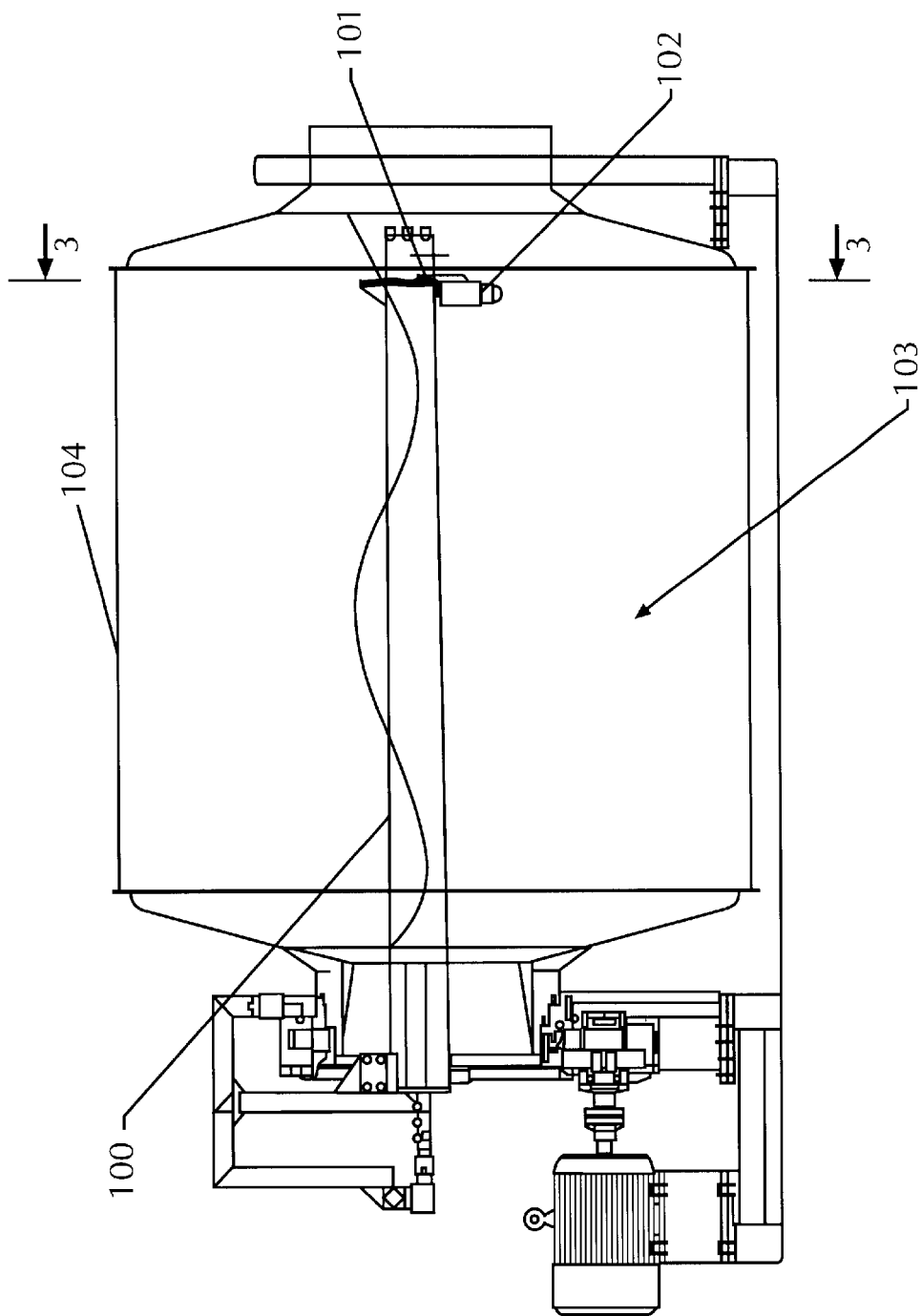
FIG. 2 is a plan view of a coating apparatus of the invention.

FIG. 1 illustrates the general coating apparatus system of this invention, which includes a coating vessel, 203, a drying gas flow system comprising a gas inlet port 202 and an outlet port 201, a fan 204, a collector 200, a dryer 206, and a heater 205 and a coating operations control system comprising the temperature and moisture sensors, 207 and 208, respectively, and a computerized control unit 209 for controlling the operation. The apparatus system used in this invention contains a dryer 206 producing a dried gas and a heater 205 for adjusting the dried gas to produce the drying gas used for maintaining the temperature of the surface of the coated centers of the mass. To be suitable for practicing the above method, a coating vessel must contain at least one of the temperature and moisture sensors described herein. One embodiment of the coating apparatus of this invention, illustrated in FIGS. 2 and 3, comprises: a coating vessel, which is exemplified in this embodiment as a rotatable drum 104, a coating solution dispenser 100, a temperature sensor 101 and a moisture sensor 102. The mass of centers 103 are placed into the vessel for coating processing.

Any conventional or commercially available coating apparatus containing a coating vessel, coating solution dispenser, gas drying elements, gas heating element, gas inlet and gas outlet ports may be used in this invention. Of course, to be suitable for practicing the above method, the coating processing apparatus must contain the temperature and moisture sensors described herein. Examples of such coating apparatus include any conventionally used coating apparatus, such as a rotatable drum apparatus, a fluidized bed apparatus or a Wurster tube apparatus, or a vibratory fluidized bed apparatus (as disclosed in application No. 09/571,596, filed May 15, 2000, now U.S. Pat. No. 6,364,948. Examples of such conventional or commercially available coating processing apparatus or systems include those as available from O'Hara Coating Systems, Inc., Toronto, Canada, Coating Machinery Systems, Inc., Des Moines, Iowa, Driam (Driamat drum coater), Spartansburg, S.C., DTG (Belt Coater), England, Dumoulin (IDA system drum coater), France, Carle and Montanari (BE 100 vertical pan), Italy, Huttlin, France, Manesty Drum Coaters, England, Pellegrini, Italy, Steinberg Drum Coater (belt coaters), Germany or described in U.S. Pat. Nos. 4,168,674, 5,495,418, 5,010,838, 4,554,887, 4,430,003 and U.S. Pat. No. 4,245,580, which may optionally contain the components described in U.S. Pat. Nos. 4,478,171, 4,334,493, 4,799,449, 4,725,446 and U.S. Pat. No. 4,639,383, the disclosures of all of which are incorporated by reference herein.

These coating apparatus contain conventional coating vessels for containing the mass of centers/coated centers during coating processing, e.g., during the application of the coating solution and drying. For example, rotatable drum apparatus contain a conventional drum (which is also called a pan), such as a tulip pan, a solid wall pan, or a perforated-wall pan for containing the centers during the coating operation. The temperature and/or moisture sensors may be mounted inside the drum such that the sensor(s) is positioned over the centers during the coating operation. Optionally, the sensor(s) may be mounted on the coating solution dispenser (e.g., on a spray arm), out of the way of the dispensing path of the coating solution. Rotatable drum apparatus also contain a mechanism for rotating the drum to tumble (intermix) the centers during the coating operation. Any conventional or commercially available rotating mechanism may be used to rotate the drum, examples of which include belt-driven or gear driven motors. In a fluidized bed coating apparatus, the centers are contained in a vessel having a perforated bottom wall. Intermixing is most commonly accomplished by passing a strong current of drying gas through the perforated wall such that the velocity of the drying gas is sufficient to suspend or fluidize the centers. Intermixing may also be accomplished by vibrating the vessel. In this apparatus, the temperature and/or moisture sensors may be similarly mounted inside the apparatus such that the sensor(s) is positioned over the centers during the coating operation. Optionally, the sensor(s) may be mounted on the coating solution dispenser, out of the way of the dispensing path of the coating solution. Any conventional or commercially available mechanisms suitable for use with fluidized bed apparatus may be used, examples of which include belt-driven or gear driven motors for vibrating the vessel and a fan (for creating sufficient air turbulence for suspending/intermixing the centers in the vessel). In a Wurster tube coating apparatus, the centers are contained within a vertical tube assembly that comprises a center tube enclosed within an exterior tube. The centers are intermixed using a very strong current of drying gas directed through the bottom of the tube, whereby the centers/coated centers are propelled through the center vertical tube in the strong current of drying gas (air). After reaching the top of the center tube, the centers fall through the exterior tube to the base of the tubes, and are again propelled up through the center tube in a current of air, thereby creating a circular flow of coated masses through the tubes. In this apparatus, the temperature and/or moisture sensors may be mounted over the top of the center vertical tube, such that the sensor(s) is positioned over the centers as they pass out of the tube. Any conventional or commercially available mechanisms suitable for use with such an apparatus may be used, examples of which include a fan (for creating sufficient air turbulence for suspending and propelling the centers through the tube).

The coating solution dispenser is used for dispensing or applying the coating solution onto the mass of centers. Examples of such dispensers include "spraying arms", such as internal spraying arms and external spraying arms, which may contain one or more nozzles for dispensing the coating solution, or a ladle. The coating solution is applied through such dispensers using compressed air and/or a pump, such as a positive displacement pump, a metering pump, a centrifugal pump, a peristaltic pump, and the like to propel the coating solution through the dispenser. The gas inlet port is mounted on the coating vessel to direct the drying gas into or through the vessel and the gas outlet port is mounted on the vessel to allow the drying gas to exit or exhaust from the vessel. Examples of such gas inlet and outlet ports are air ducts and insertion tubes. One or more fans or blowers may be used to power the current of the drying gas through the coating vessel and through the drying gas (air) handling system (through the collector(s), dryer and heater), as needed. Any suitable conventional fan or blower may be used.

Advantageously, in the method of this invention, when using a rotatable drum or any other coating vessel that does not require a current of drying gas to intermix the centers, the drying gas may be used at reduced flow rates. As described above, the drying gas used herein may be adjusted to temperatures well above the melting point or degradation point of the centers to be coated and still maintain the surface temperature of the centers at a predetermined temperature or within a predetermined temperature range that is below the melting point or degradation point of the centers. The present method, apparatus and system enables the operator to balance/manipulate the temperature of the drying gas and the flow rate of the drying gas to maintain a predetermined temperature on the surface of the coated centers. For example, the temperature of the drying gas may be adjusted to maintain the temperature of the surface of the coated centers at a predetermined temperature wherein the drying gas flow rate remains constant. Optionally, both the temperature and the flow rate of the drying gas may be adjusted to maintain the temperature of the surface of the coated centers at a predetermined temperature.

As described herein the temperature sensor in this invention is used to measure the temperature of the surface of the coated centers of the mass. The moisture sensor is used to measure the moisture content of the surface of the coated center of the mass. Advantageously, the temperature and moisture sensors used in this invention are non-contact sensors. It will be understood by those skilled in the art that any non-contact temperature and moisture sensor will be suitable for use in the method and apparatus of this invention. Preferably, such non-contact sensors are infra-red sensors and near infrared sensors. Because the sensors are not in contact with the rotating mass of coated centers, damage to the sensors caused by repeated collisions with the coated centers is essentially eliminated. Moreover, damage to the coated centers by repeated collisions with the sensor(s) do not occur. Most preferably, the moisture sensor used herein is a near infra-red moisture sensor and the temperature sensor is an infra-red temperature sensor. Examples of such moisture sensors are available form Sensor Controls, Inc., Milpites, Calif. Example of such temperature sensors are available from Raytek, Corp., Santa Cruz, Calif. and Watlow, St. Louis, Mo.

The drying gas used in this invention may be dried using any conventional de-humidifying processing apparatus. Manufacturers of such de-humidifying/drying apparatus include Kathabar Inc. (manufacturer of apparatus suitable for use with lithium chloride solution desiccants), New Brunswick, N.J., Carrier Corp. (manufacturer of air conditioning apparatus to de-humidify air by cooling), Syracuse, N.Y., Cargocaire Engineering Corp. (manufacturer of apparatus suitable for use with solid desiccants), Amesbury, Mass. Conventionally, the drying gas used in coating processing has a dew point of about 5° C. The drying gas used in the method of this invention may be advantageously much drier. Preferably, the moisture content of the drying gas used in the method of this invention may be maintained to have a dew point of about 0° C. (3.7 g water/kg dry air) to about −15° C. (1.0 g water/kg dry air). Accordingly, the method and apparatus of this invention may preferably employ a desiccant for drying the drying gas. Examples of desiccants useful in this invention include, but are not limited to a solid desiccant or a lithium chloride solution, wherein the lithium chloride solution is used as a desiccant. As indicated above, such solid and solution desiccants, and the methods and apparatus suitable for use with such desiccants, are known and are commercially available. The drying gas may be dried by passing the gas through an apparatus containing a solid desiccant, such as silica. Alternatively, the gas may be dried by passing the gas through a lithium chloride solution spray which contains about 30–45 wt. % lithium chloride. The drying process may be conducted using a lithium chloride solution maintained at any suitable temperature for a selected lithium chloride concentration, as is known in the art (e.g., an aqueous 30 wt. % LiCl solution may be used at temperature of from about −17° C. to about 103° C., whereas an aqueous 45 wt. % LiCl may be used at temperature of from about 18° C. to about 104° C.). Preferably, drying of the gas is conducted using a lithium chloride solution maintained at a temperature of about 5° C. to about 50° C.

In this invention, the temperature of the drying gas is adjusted to a temperature suitable for maintaining the surface of the coated centers in the mass at a predetermined temperature or within a predetermined temperature range. The drying gas may be heated or cooled, as required, to provide a drying gas having a temperature suitable for maintaining the surface of the coated centers in the mass at a predetermined temperature or within a predetermined temperature range. The heating element used for adjusting (increasing) the temperature of the drying gas must be responsive to changes in the surface temperature of the coated centers in the mass, as measured by the temperature sensor. The increased rate of drying provided by the method of this invention may result in relatively rapid changes in the surface temperature of the coated centers of the mass. Accordingly, the heating element used in the apparatus, system and method of this intention must be capable of responding to such changes by heating (heating to a higher temperature) or cooling (heating to a lower temperature or not heating) the drying gas with comparable speed. Any conventional heating element that can rapidly change the amount of heat applied to a gas source may be used. Examples of such heating element include electrical heating elements, low mass steam injection heaters, direct fire gas heaters, and the like. Preferably, the heating element is an electrical heating element. Optionally, the temperature of the drying gas may be adjusted (reduced) by introducing a current of cool air into the current of drying gas.

Conventional coating apparatus systems are designed to pass the current of drying gas through the coating vessel only once or to re-cycle the drying gas through the coating vessel. In the re-cycling systems, the drying gas is in a loop where it is repeatedly subjected to drying, heating, and passage through the coating vessel. Additional filters, collectors, or scrubbers may be placed in the loop to remove any materials in the gas that may be carried by the drying gas exhausted from the coating vessel during drying step or that may be introduced into the drying gas during the drying or heating operations. Often, the drying gas exhausted from the coating vessel contains fine particulates of the coating solution ingredient(s). These fine particulates may be explosive or combustible and need to be removed from the drying gas stream, especially prior to heating. For example, drying gas that has passed through a coating vessel wherein a sugar solution was sprayed onto a mass of centers may contain very fine sugar particulates which may be removed by passing the gas through a particle filter or dust collector. The process of drying the gas may also introduce fine materials into the dried gas. For example, gas that is dried using the lithium chloride solution is preferably passed through another collector, specifically, a mist-elimination apparatus, prior to heating, to remove any fine mist droplets that may be present in the dried gas. Alternatively, gas that is dried using a solid desiccant may be passed through another dust collector to remove any particulates of the solid that may be present in the dried gas. Typically, commercially available lithium chloride solution drying apparatus contain such mist-elimination apparatus as part of the drying apparatus. It is considered to be within the skill of one in the art to incorporate as many filters, collectors or scrubbers in the drying gas flow system of the coating apparatus system of this invention to purify the gas at a selected stage of the flow system to provide a gas of suitable quality.

Advantageously, the coating apparatus system of this invention contains a computerized control unit that monitors the temperature and moisture content of the surface of the centers in the coating vessel and links the output thereof to the operation of other components of the system. Any and all operational variables (e.g., activation of the coating solution dispenser, the amount of coating solution to be dispensed into the coating vessel as well as the type of coating solution to be dispensed into the coating vessel (more than one coating solution may be used to prepare a finished coated product)) may be controlled by a computerized control unit in a conventional manner. In the present invention, the computerized control unit preferably controls at least the temperature to which the drying gas is adjusted (heated/ cooled), the dispensing of the coating solution onto the mass of centers in the coating vessel, the flow of the drying gas through the coating vessel, and monitors the temperature and moisture content of the surface of the centers in the coating vessel. Advantageously, the computerized control unit controls the drying process by linking an increase or decrease in the surface temperature of the coated centers to a decrease or an increase in the temperature of the drying gas adjusted (heated or cooled). As described above, the drying gas used in this invention may be substantially higher than the melting point or degradation temperature of the centers, particularly when large amounts of water are being evaporated (e.g., when the adiabatic cooling effect is most significant). However, as drying progresses, the adiabatic cooling effect diminishes and the surface temperature of the coated centers exposed to the current of hot drying gas can begin to increase. The temperature of the drying gas must then be adjusted to prevent the temperature of the surface of the coated centers from rising above the predetermined temperature or predetermined temperature range. The computerized control in this invention provides for frequent monitoring of the surface temperature (frequent monitoring of the temperature sensor output) and correlation of that output with adjustment of the temperature of the drying gas. When the surface temperature of the coated centers begins to rise above the predetermined temperature or approaches the upper limit of the predetermined temperature range, the temperature of the drying gas is adjusted (by heating to a lower temperature or by introducing cool air into the current of drying gas) to reduce the surface temperature to the predetermined temperature or to within the predetermined temperature range.

The computerized control unit also controls the coating solution dispensing process and the termination of the coating process by linking the output of the moisture sensor (the moisture content of the surface of the coated centers) optionally to the dispensing of the coating solution onto the mass of centers in the coating vessel and/or to the flow of the drying gas through the coating vessel. When the moisture content of the surface of the coated centers reaches a predetermined dryness between about 0% and 30% water, by weight, the drying cycle is determined to have reached completion. At that time the mass of coated centers may be sprayed with an additional amount of coating solution to start another drying cycle. Accordingly, the control unit may activate a pump to disperse an amount of coating solution through the coating solution dispenser onto the coated mass of centers. Optionally, the control unit may also shut off the drying gas fan or blower or re-route the drying gas to bypass the coating vessel when the coated centers have reached a predetermined dryness (surface moisture content), when dispensing the coating solution or when distributing the coating solution to coat the centers. It is considered to be within the skill of one in the art to utilize conventional internal control loop programs (PID, neural networks, lookup tables, etc.) to provide such computerized control over the coating method of this invention. Because this coating method, apparatus and system utilizes. sensors that are not conventionally used, the computer programming controls of conventional or commercially available coating apparatus systems need to be re-programed to provide for monitoring of the temperature and moisture sensors rather than the air temperature sensors that are monitored in conventional coating operations. It is considered to within the skill of one in the art to reprogram such coating operation controls to monitor the output of different sensors and to link the output of such sensors to other operations in the coating system, e.g., the drying gas heater, fan/blower or spray pump.

One or more polishing or finishing coatings may be applied to the coated centers produced by the method described herein. These finishing/polishing coatings may include colored coatings, enteric coatings, finishing glazes, wax coatings and the like. Enteric coatings (finishing coatings that are resistant to digestion in the stomach) may be desirable for use in the preparation of coated tablets containing pharmaceutical compounds or compositions. Any conventional finishing/polishing coating may be used to provide a finished coated product having the desired appearance, shelf-stability or physiological stability. For example, coating solutions containing polishing gums (e.g., gum arabic, dextrin and the like), paste waxes (e.g., carnuba wax, beeswax, zein and the like), shellac (e.g. food grade shellac), powder waxes, corn syrup, dextrose polymers, butter, celluloses (ethyl cellulose, hydroxypropyl methyl cellulose, hydroxypropyl methyl cellulose phthalate, cellulose acetate phthalate, polyvinylacetate phthalate, acrylate polymers and the like) may be used to prepare the finished coated centers having the desired characteristics. Typically, such finishing/polishing coatings are composed of only 1 to 5 layers of coating materials. These coatings may advantageously be applied using the method of this invention described hereinabove wherein a polishing or finishing coating solution is applied to the coated centers and the finished coated product is produced by drying the finish-coated, coated centers according to the method described hereinabove until the surface moisture of the finished coated centers of the mass is about 0% to about 30% water, by weight.

As described above, the method of this invention is especially useful for coating of thermally sensitive centers that are composed of a center having a low melting point or that degrades or is adversely affected by mildly elevated temperatures. Accordingly, one embodiment of this invention relates to an improved method for producing a shell coating on a mass of thermally sensitive centers comprising dispensing a coating solution onto the mass of centers and drying the coated centers with a current of drying gas; the improvement comprising measuring the temperature of the surface of the coated centers of the mass and drying the coated centers by adjusting the temperature of the drying gas in response to the temperature measurement of the surface of the coated centers to maintain the temperature of the surface of the coated centers at a temperature that is less than the melting point or degradation temperature of the thermally sensitive center. Another embodiment of this invention relates to an improved method for producing a shell coating on a mass of thermally sensitive centers comprising dispensing a coating solution onto the mass of centers and drying the coated centers with a current of drying gas; the improvement comprising measuring the moisture content of the surface of the coated centers of the mass and drying the coated centers until the moisture content of the surface of the coated centers is about 0% to about 30% water, by weight. In preferred embodiments of this invention, the thermally sensitive centers comprise chocolate, chocolate-containing compositions, cocoa-containing compositions and nut-flavored or nut-containing compositions.

In another embodiment, of this invention relates to the method for producing confectioneries comprising a candy shell coating or, optionally, a colored candy shell coating. Any food grade pigment may be incorporated into the coating solution and used in the method of this invention. In a preferred embodiment, this invention relates to a method for producing a candy shell coating on a mass of chocolate, chocolate-containing or peanut butter-containing centers. According to this invention, the method for producing a shell coating on a mass of chocolate, chocolate-containing or peanut butter-containing centers comprises dispensing a coating solution onto the mass of centers and drying the coated centers with a current of air; the improvement comprising:

(a) measuring the temperature of the surface of the coated centers of the mass;

(b) measuring the moisture of the surface of the coated centers of the mass; and (c) drying the coated centers by adjusting the temperature of the drying gas in response to the temperature measurement of the surface of the coated centers to maintain the temperature of the surface of the coated centers at a temperature less than the melting point of the centers and drying the coated centers until the moisture content of the surface of the coated centers is about 0% to about 30% water, by weight.

More specifically, the method for producing a candy shell coating on a mass of chocolate, chocolate-containing or peanut butter-containing centers according to this invention comprises the steps of:

(a) placing a mass of chocolate, chocolate-containing or peanut butter-containing centers in a coating vessel;

(b) intermixing the mass of centers;

(c) spraying the mass of centers with a sugar syrup or a colored sugar syrup to coat the centers;

(d) measuring the temperature of the surface of the coated centers of the mass using a temperature sensor;

(e) drying the coated centers by passing a current of drying gas through the coating vessel and adjusting the temperature of the drying gas in response to the temperature measurement of step (d) to maintain the temperature of the surface of the coated centers at a temperature of about 20° C. to about 26° C.; and (f) repeating steps (c) through (e) 1 to 50 times to produce a sugar-coated product.

This method may advantageously further comprise measuring the moisture content of the surface of the coated centers of the mass using a moisture sensor and drying the coated centers until the surface moisture of the coated centers is about 0% to about 30% water, by weight.

The coating vessel used in the method for producing a shell coating on a mass of chocolate, chocolate-containing or peanut butter-containing centers is preferably a rotatable drum coating apparatus, a fluidized bed apparatus or a vibrated bed apparatus. More preferably, the coating vessel is a rotatable drum apparatus and the mass of centers is intermixed (tumbled) by rotating the drum. In the method of this invention, the rate of air flow (current of drying gas) through the drum may be significantly reduced, as compared to flow rates conventionally used with rotatable drum apparatus. For example, in this invention, flow rates of about 1,800 ft$^3$/min to about 4,000 ft$^3$/min may be used for coating a mass of centers weighing about 2,500 kilograms (kg). Preferably, the drying gas is air, the air flow rate is about 2,500 ft$^3$/min to about 3,500 ft$^3$/min for drying a mass of centers weighing about 2,500 kg and the air may be adjusted to temperatures between about 20° C. to about 60° C. The temperature of the surface of the coated chocolate and peanut butter centers is maintained in the range of about 20° C. to about 26° C., more preferably, the surface temperature is in the range of about 21° C. to about 25° C. and most preferably, the surface temperature is about 22° C. to about 24° C. For example, the temperature of the air may be about 50° C. for about 1 minute after the sugar syrup is sprayed onto the centers and the temperature of the air is about 26° C. when the moisture content of the coated centers is about 0% to about 30% water, by weight.

One or more polishing or finishing coatings may be applied to the sugar-coated chocolate, chocolate-containing or peanut butter-containing products, which may or may not be colored. Unlike sugar coatings, which may be composed of many separate sugar layers, such polishing or finishing coatings are composed of only 1 to 5 layers. Confectioneries typically contain polishing or finishing coatings that contain a polishing gum, an edible wax, or butter. These additional coatings may be applied to the sugar-coated chocolate, sugar-coated chocolate-containing or sugar-coated peanut butter-containing centers, produced as described above, by the method comprising the steps of:

(a) placing a mass of the sugar-coated centers in a coating vessel;

(b) intermixing the mass of coated centers;

(c) dispensing a coating solution comprising a polishing gum, an edible wax, or butter onto the mass of centers;

(d) measuring the temperature of the surface of the coated centers of the mass using a temperature sensor;

(e) drying the coated centers by passing a current of drying gas through the coating vessel and adjusting the temperature of the drying gas in response to the temperature measurement of step (d) to maintain the temperature of the surface of the coated centers at a temperature of about 20° C. to about 26° C.; and (f) repeating steps (c) through (e) 1 to 5 times to produce a finished sugar-coated chocolate or peanut butter product.

While the invention has been described in terms of preferred embodiments and specific examples, those skilled in the art will recognize that various changes and modifications can be made without departing from the spirit and scope of the invention. Thus, the invention should be understood as not being limited by the foregoing detailed description, but as being defined by the appended claims and their equivalents.

We claim:

1. In a method for producing a shell coating on a mass of confectionery centers, comprising dispensing a coating solution onto the centers and drying the coated centers with a current of drying gas, wherein the improvement comprises making a direct measurement of the moisture content of the surface of the coated centers of the mass using a moisture sensor, drying the drying gas to a dew point of from about −15° C. to about 0° C., and drying the coated centers until the moisture content of the surface of the coated centers is about 0% to about 30% water, by weight.

2. In a method for producing a shell coating on a mass of confectionery centers having a melting or degradation temperature of a surface of less than about 50° C., comprising dispensing a coating solution onto the centers and drying the coated centers with a current of drying gas, wherein the improvement comprises:

(a) making a direct measurement of the temperature of the surface of the coated centers of the mass, and drying the coated centers by adjusting the temperature of the drying gas to a temperature higher than that of the melting or degradation temperature in response to the direct temperature measurement of the surface of the coated centers, while maintaining the temperature of the surface of the coated centers at a temperature less than the melting or degradation temperature of the surface; and (b) monitoring the moisture content of the surface of the coated centers of the mass by making a direct measurement of the moisture content of the centers using a moisture sensor while drying the coated centers until the moisture content of the surface of the coated centers is about 0% to about 30% water, by weight.

3. The method of claim 2, further comprising maintaining the surface of the coated centers at a temperature less than the melting or degradation temperature of the coated centers by adiabatic cooling.

4. A method for producing a shell coating on a mass of confectionery centers, comprising the steps of:

(a) placing a mass of confectionery centers having a melting or degradation temperature of a surface of less than about 50° C. in a coating vessel;

(b) intermixing the mass of centers;

(c) dispensing a coating solution onto the mass of centers;

(d) making a direct measurement of the moisture content of the surface of the coated centers of the mass using a moisture sensor;

(e) making a direct measurement of the temperature of the surface of the coated centers of the mass, and drying the coated centers by adjusting the temperature of the drying gas to a temperature higher than that of the melting or degradation temperature in response to the direct temperature measurement of the surface of the coated centers, while maintaining the temperature of the surface of the coated centers at a temperature less than the melting or degradation temperature of the surface;

(f) drying the coated centers by passing a current of drying gas through the coating vessel until the surface moisture of the coated centers is about 0% to about 30% water, by weight; and (g) repeating steps (c) through (f) a predetermined number of times to produce a finished product.

5. The method according to claim 4, further comprising the steps of:

drying the drying gas to a dew point of from about −15° C. to about 0° C.

6. The method according to claim 5, further comprising maintaining the surface of the coated centers at a temperature less than the melting or degradation temperature of the coated centers by adiabatic cooling.

7. The method according to claim 4, comprising drying the coated centers until the surface moisture of the coated centers is about 0% to about 10% water, by weight.

8. The method according to claim 4, wherein the centers comprise a chocolate, a chocolate-containing composition, a cocoa-containing composition, a nut-flavored composition or a nut-containing composition.

9. A method for producing a shell coating on a mass of confectionery centers, comprising the steps of:

(a) placing a mass of confectionery centers having a melting or degradation of a surface of less than about 50° C. in a coating vessel;

(b) intermixing the mass of centers;

(c) making a direct measurement of the temperature of the surface of the centers of the mass using a temperature sensor;

(d) dispensing a coating solution onto the mass of centers while passing a current of drying gas through the coating vessel until the centers have attained a predetermined weight, wherein the temperature of the drying gas is adjusted in response to the direct temperature measurement of step (c) to maintain the temperature of the surface of the coated centers at a temperature less than the melting or degradation temperature of the surface and the temperature of the drying gas at a temperature higher than the melting or degradation temperature; and (e) monitoring the moisture content of the surface of the coated centers of the mass by making a direct measurement of the moisture content of the centers using a moisture sensor while drying the coated centers with a drying gas having a dew point of from about −15° C. to about 0° C., until the surface moisture of the coated centers is about 0% to about 30% water, by weight, (f) to produce a finished product.

10. The method according to claim 9, comprising drying the coated centers until the surface moisture of the coated centers is about 0% to about 10% water, by weight.

11. The method of claim 9, further comprising maintaining the surface of the coated centers at a temperature less than the melting or degradation temperature of the coated centers by adiabatic cooling.

12. The method for producing a candy shell coating on a mass of centers comprising a chocolate or a peanut butter-containing composition, the method comprising the steps of:

(a) placing a mass of chocolate, chocolate-containing or peanut butter-containing centers having a melting or degradation temperature of a surface of less than about 50° C. in a coating vessel;

(b) intermixing the mass of centers;

(c) spraying the mass of centers with a sugar syrup or a colored sugar syrup to coat the centers;

(d) making a direct measurement of the temperature of the surface of the coated centers of the mass and drying the coated centers by adjusting the temperature of the drying gas to a temperature higher than that of the melting or degradation temperature in response to the direct temperature measurement of the surface of the coated centers, while maintaining the temperature of the surface of the coated centers at a predetermined temperature less than the melting or degradation temperature of the surface;

(e) making a direct measurement of the moisture content of the surface of the coated centers of the mass using a moisture sensor while drying the coating centers by passing a current of drying gas, optionally having a dew point of from about −15° C. to about 0° C., through the coating vessel until the surface moisture of the coated centers is about 0% to about 30% water; by weight; and (f) repeating steps (c) through (e) 1 to 50 times to produce a sugar-coated product.

13. A method for producing a candy shell coating on a mass of centers comprising a chocolate or a peanut butter-containing composition, the method comprising the steps of:

(a) placing a mass of chocolate, chocolate-containing or peanut butter-containing centers having a melting or degradation temperature of a surface of less than about 50° C. in a coating vessel;

(b) intermixing the mass of centers;

(c) spraying the mass of centers with a sugar syrup or a colored sugar syrup to coat the centers;

(d) making a direct measurement of the temperature of the surface of the coated centers of the mass using a temperature sensor and making a direct measurement of the moisture content of the surface of the coated centers of the mass using a moisture sensor while drying the coated centers until the surface moisture of the coated centers is about 0% to about 30% water, by weight, by passing a current of drying gas through the coating vessel;

(e) adjusting the temperature of the drying gas to a temperature greater than the melting or degradation temperature in response to the direct temperature measurement to maintain the temperature of the surface of the coated centers at a temperature of about 20° C. to about 26° C.; and (f) repeating steps (c) through (e) 1 to 50 times to produce a sugar-coated product.

14. The method according to claim 13, comprising drying the coated centers until the surface moisture of the coated centers is about 0% to about 10% water, by weight.

15. The method of claim 13, further comprising maintaining the surface of the coated centers at a temperature less than the melting or degradation temperature of the coated centers by adiabatic cooling.

* * * * *